US012113709B2

(12) United States Patent
Landais et al.

(10) Patent No.: US 12,113,709 B2
(45) Date of Patent: Oct. 8, 2024

(54) APPARATUS, METHOD AND COMPUTER PROGRAM FOR GROUP COMMUNICATION

(71) Applicant: NOKIA TECHNOLOGIES OY, Espoo (FI)

(72) Inventors: Bruno Landais, Pleumeur-Bodou (FR); Laurent Thiebaut, Antony (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 400 days.

(21) Appl. No.: 17/594,103

(22) PCT Filed: Apr. 2, 2019

(86) PCT No.: PCT/EP2019/058326
§ 371 (c)(1),
(2) Date: Oct. 1, 2021

(87) PCT Pub. No.: WO2020/200436
PCT Pub. Date: Oct. 8, 2020

(65) Prior Publication Data
US 2022/0182321 A1 Jun. 9, 2022

(51) Int. Cl.
H04L 45/74 (2022.01)
H04W 40/02 (2009.01)
H04W 84/12 (2009.01)

(52) U.S. Cl.
CPC .......... H04L 45/74 (2013.01); H04W 40/02 (2013.01); H04W 84/12 (2013.01)

(58) Field of Classification Search
CPC ...... H04L 45/74; H04W 40/02; H04W 84/12; H04W 4/06; H04W 80/02; H04W 80/04; H04W 4/08; H04W 88/14; H04W 76/40
See application file for complete search history.

(56) References Cited

U.S. PATENT DOCUMENTS

2017/0228407 A1* 8/2017 Mano .................... G06F 16/221
2021/0075723 A1* 3/2021 Sun ......................... H04L 45/74
2021/0219206 A1* 7/2021 Zhu ......................... H04L 45/74

FOREIGN PATENT DOCUMENTS

WO   WO 2019/033958 A1   2/2019
WO   WO-2020147019 A1 *  7/2020 ............ H04W 76/40

OTHER PUBLICATIONS

Ericsson et al., "Control of Traffic Forwarding in 5G-LAN", 3GPP TSG-SA WG2 Meeting #131, S2-1902848, (Feb. 25-Mar. 1, 2019), 11 pages.

(Continued)

Primary Examiner — Sharmin Chowdhury
(74) Attorney, Agent, or Firm — Robert P. Michal, Esq.; Carter, DeLuca & Farrell LLP

(57) ABSTRACT

There is disclosed an apparatus (408). The apparatus comprises means for performing: receiving user plane traffic at the apparatus (408), the user plane traffic intended for a group local area network communication; and determining a target destination address for the user plane traffic; and autonomously handling the received user plane traffic at the apparatus (408) in dependence on the target destination address; and wherein the autonomously handling the received user plane traffic by the apparatus comprises determining whether the destination address is recognised by the apparatus (408); and forwarding the user plane traffic towards all interfaces (424) tagged as network interfaces associated with the group communication, when the destination address is determined to be not recognised by the apparatus (408).

13 Claims, 9 Drawing Sheets

(56) References Cited

OTHER PUBLICATIONS

"3rd Generation Partnership Project; Technical Specification Group Core Network and Terminals; Interface between the Control Plane and the User Plane Nodes; Stage 3 (Release 15)", 3GPP TS 29.244 v15.5.0, (Mar. 2019), 198 pages.

"3rd Generation Partnership Project; Technical Specification Group Core Network and Terminals; General Packet Radio System (GPRS) Tunnelling Protocol User Plane (GTPv1-U) (Release 15)", 3GPP TS 29.281 v15.5.0, (Dec. 2018), 32 pages.

"3rd Generation Partnership Project; Technical Specification Group Services and System Aspects; Policy and Charging Control Framework for the 5G System; Stage 2 (Release 16)", 3GPP TS 23.503 v16.0.0, (Mar. 2019), 84 pages.

International Search Report and Written Opinion for Patent Cooperation Treaty Application No. PCT/EP2019/058326 dated Nov. 6, 2019, 12 pages.

"3rd Generation Partnership Project; Technical Specification Group Services and System Aspects; System Architecture for the 5G System; Stage 2 (Release 16)", 3GPP TS 23.501, V16.0.0, Mar. 2019, pp. 1-318.

Office action received for corresponding European Patent Application No. 19718585.3, dated Jan. 31, 2024, 4 pages.

\* cited by examiner

APPARATUS, METHOD AND COMPUTER PROGRAM FOR GROUP COMMUNICATION

CROSS-REFERENCE TO RELATED APPLICATIONS

This application is a national phase entry of International Application No. PCT/EP2019/058326, filed Apr. 2, 2019, the entire contents of which are incorporated herein by reference.

FIELD

This disclosure relates to communications, and more particularly to an apparatus, method and computer program in a wireless communication system. More particularly the present invention relates to 5G LAN group communication.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

A communication system and associated devices typically operate in accordance with a given standard or specification which sets out what the various entities associated with the system are permitted to do and how that should be achieved. Communication protocols and/or parameters which shall be used for the connection are also typically defined.

Since introduction of fourth generation (4G) services increasing interest has been paid to the next, or fifth generation (5G) standard. 5G may also be referred to as a New Radio (NR) network.

STATEMENT OF INVENTION

According to a first aspect there is provided an apparatus comprising means for performing receiving user plane traffic at the apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to some examples, the means are further configured to perform forwarding the user plane traffic to the target destination address when the apparatus recognises the target destination address.

According to some examples, the means are further configured to perform determining whether the user plane traffic comprises information indicating that the user plane traffic has previously been forwarded over a network interface associated with the group communication, and dropping the user plane traffic when it is determined that the apparatus does not recognise the target destination address and the user plane traffic has been previously forwarded over a network interface associated with the group communication.

According to some examples, the means are further configured to perform storing information of user equipment addresses of user equipment served by a user plane function from which the apparatus received the user plane traffic, when receiving user plane traffic from a remote user equipment or from a network interface associated with the group communication.

According to some examples, the apparatus comprises a user plane function.

According to some examples, the user plane traffic comprises one of: an internet protocol packet of a packet data unit session; an Ethernet frame of an Ethernet packet data unit session.

According to some examples, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: receiving user plane traffic at the apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to a third aspect there is provided an apparatus comprising: receiving circuitry for receiving user plane traffic at the apparatus, the user plane traffic intended for a group local area network communication; and determining circuitry for determining a target destination address for the user plane traffic; and handling circuitry for autonomously handling the received user plane traffic at the apparatus in dependence on the target destination address; and wherein the autonomously handling the received user plane traffic by the apparatus comprises determining whether the destination address is recognised by the apparatus; and forwarding circuitry for forwarding the user plane traffic towards all interfaces tagged as network interfaces associated with the group communication, when the destination address is determined to be not recognised by the apparatus.

According to a fourth aspect there is provided a method comprising: receiving user plane traffic at an apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to some examples the method further comprises forwarding the user plane traffic to the target destination address when the apparatus recognises the target destination address.

According to some examples the method further comprises determining whether the user plane traffic comprises information indicating that the user plane traffic has previously been forwarded over a network interface associated with the group communication, and dropping the user plane traffic when it is determined that the apparatus does not recognise the target destination address and the user plane traffic has been previously forwarded over a network interface associated with the group communication.

According to some examples the method further comprises storing information of user equipment addresses of user equipment served by a user plane function from which the apparatus received the user plane traffic, when receiving user plane traffic from a remote user equipment or from a network interface associated with the group communication.

According to some examples the method further comprises using stored information of remote user equipment addresses when sending user plane traffic by the apparatus to one or more of the user equipment or to a network interface associated with the group communication.

According to some examples the apparatus comprises a user plane function.

According to some examples the user plane traffic comprises one of: an internet protocol packet of a packet data unit session; an Ethernet frame of an Ethernet packet data unit session.

According to a fifth aspect there is provided a computer program comprising instructions for causing an apparatus to perform at least the following: receiving user plane traffic at the apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to a sixth aspect there is provided a computer program comprising instructions stored thereon for performing at least the following: receiving user plane traffic at an apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to a seventh aspect there is provided a non-transitory computer readable medium comprising program instructions for causing an apparatus to perform at least the following: receiving user plane traffic at the apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to an eighth aspect there is provided a non-transitory computer readable medium comprising program instructions stored thereon for performing at least the following: receiving user plane traffic at an apparatus, the user plane traffic intended for a group local area network communication; and determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus; and forwarding the user plane traffic towards all interfaces tagged as network interfaces associated with the group communication, when the destination address is determined to be not recognised by the apparatus.

According to a ninth aspect there is provided an apparatus comprising means for performing: sending user plane traffic from the apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to some examples, the means are further configured to perform appending the information indicating that the user plane traffic has been forwarded over a network interface associated with the group communication to user plane traffic sent over said network interface associated with the group communication.

According to some examples, the apparatus comprises a user plane function.

According to some examples, the user plane traffic comprises one of: an internet protocol packet of a packet data unit session; an Ethernet frame of an Ethernet packet data unit session.

According to some examples, the means comprises at least one processor; and at least one memory including computer program code, the at least one memory and computer program code configured to, with the at least one processor, cause the performance of the apparatus.

According to a tenth aspect there is provided an apparatus comprising at least one processor; and at least one memory including computer program code; the at least one memory and the computer program code configured to, with the at least one processor, cause the apparatus at least to perform: sending user plane traffic from the apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to an eleventh aspect there is provided an apparatus comprising: sending circuitry for sending user plane traffic from the apparatus to all user plane functions in a same local area network group as the apparatus, the user plane traffic having a destination address unknown to the apparatus; and appending circuitry for appending information to the user plane traffic indicating that the user plane traffic has been forwarded over a network interface associated with the group communication.

According to a twelfth aspect there is provided a method comprising: sending user plane traffic from an apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to some examples the method comprises appending the information indicating that the user plane traffic has been forwarded over a network interface associated with the group communication to user plane traffic sent over said network interface associated with the group communication.

According to some examples the apparatus comprises a user plane function.

According to some examples the user plane traffic comprises one of: an internet protocol packet of a packet data unit session; an Ethernet frame of an Ethernet packet data unit session.

According to a thirteenth aspect there is provided a computer program comprising instructions for causing an apparatus to perform at least the following: sending user plane traffic from the apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to a fourteenth aspect there is provided a computer program comprising instructions stored thereon for performing at least the following: sending user plane traffic from an apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to a fifteenth aspect there is provided a non-transitory computer readable medium comprising program instructions for causing an apparatus to perform at least the following: sending user plane traffic from the apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

According to a sixteenth aspect there is provided a non-transitory computer readable medium comprising program instructions stored thereon for performing at least the following: sending user plane traffic from an apparatus to all user plane functions in a same local area network group as the apparatus, the user plane traffic having a destination address unknown to the apparatus; and appending information to the user plane traffic indicating that the user plane traffic has been forwarded over a network interface associated with the group communication.

BRIEF DESCRIPTION OF FIGURES

The invention will now be described in further detail, by way of example only, with reference to the following examples and accompanying drawings, in which.

DETAILED DESCRIPTION

Figure 1:
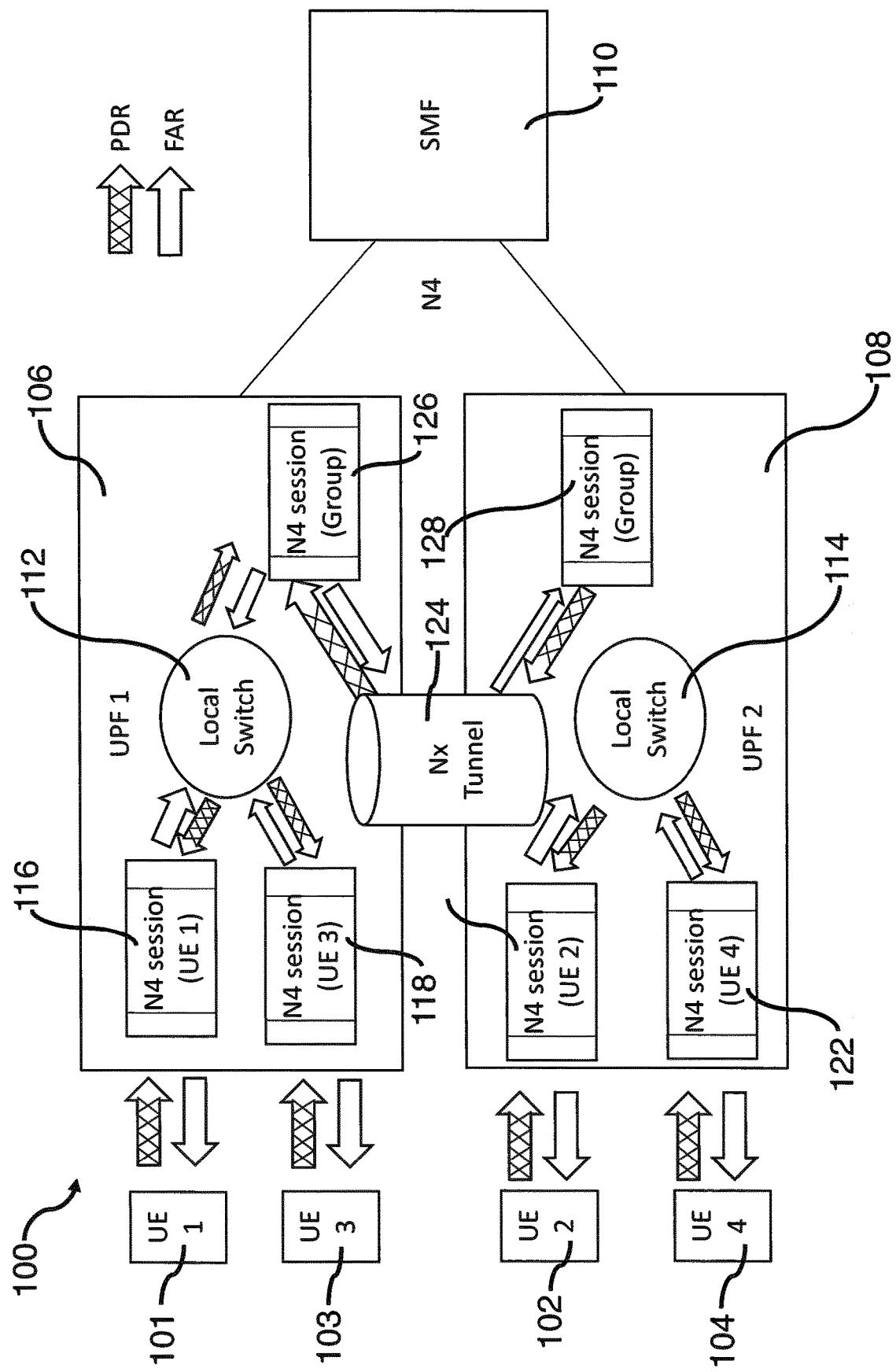
FIG. 1 shows parts of a group LAN according to an example.

5G LAN (local area network) Group Communication is a new feature being standardized by 3GPP in Release 16. It allows the public land mobile network (PLMN) operator to provide group communications between subscribers of a 5G LAN Group. According to 5G LAN the user plane traffic sent by group members can be routed by the PLMN towards the recipient of the packet using any of the following approaches:
  a) Local switch. Traffic is locally forwarded by a single user plane function (UPF) if this UPF is the common packet data unit (PDU) session anchor (PSA) UPF of different PDU Sessions for the same 5G LAN group;
  b) Nx-based forwarding. Nx depicts the interface between two UPFs acting as PSA for a 5G LAN group; Nx is configured by the (set of) SMF that control the communication services within a 5G LAN group. The uplink/downlink (UL/DL) traffic for the 5G-LAN communication is forwarded between PSA UPFs via Nx. Nx is based on a shared User Plane tunnel connecting PSA UPFs of a single 5G LAN group; or
  c) N6-based forwarding of user plane traffic. N6 is the interface between a UPF and a data network (e.g. a corporate LAN).

5G LAN Group Communication may be internet protocol (IP) or Ethernet traffic (i.e. PDU session type may be IPv4, IPv6, IPv4v6 or Ethernet). For Ethernet traffic, several devices with different media access control (MAC) addresses may be used behind one particular user equipment (UE)/member of the group, in which case the UPF may learn on the fly, by monitoring the traffic, the MAC addresses used behind every UE so as to be able to route downlink traffic targeting any of these MAC addresses towards the UE's PDU sessions. The session management function (SMF) may request the UPF to report the MAC addresses it detects.

Traffic may be sent between two members only of a 5G LAN Group or may be multicast to all the members of the group. To enable local switching and Nx-based switching of traffic between members of a group, the SMF needs to provision PDRs (Packet Detection Rules) and FARs (Forwarding Action Rules) in the UPF(s) involved in the group communication, so that any traffic targeting one or more members of the group is routed towards the UPF(s) of the recipient(s).

3GPP CR 23.501 #0909 (S2-1902848) has started to define how the SMF needs to provision the UPF to control the routing of group communication traffic. This requires in particular, for Nx-based forwarding:

a) the SMF to provision the UPF with PDRs/FARs so as to forward traffic targeting an IP or MAC destination address of other group members served by different UPFs towards these UPFs using Nx-based forwarding. This also requires the UPF to notify the SMF when it cannot perform this function.

b) the SMF to provision a default PDR in the group-level N4 Session to capture the packets pertaining to 5G LAN group communication with an unknown destination address and a Usage Reporting Rule (URR) to trigger reporting of such events. This enables the SMF to reactively configure relevant PDR and FAR to forward the packets to another UPF via Nx, based on the reports from UPF.

In the 5G Core network the N4 Interface is the communication means or communication connection between the control plane and the user plane e.g. the communication means or communication connection between UPF and SMF as shown in FIG. 1.

The above principles could result in significant signalling and overhead for large 5G LAN groups, to provision all the necessary instructions in all UPFs involved by the 5G LAN group members, be it pro-actively (prior to any exchange of traffic) or reactively (upon receipt of event reports for a URR associated to a default PDR, when traffic is found by the UPF with an unknown destination address). The overhead can become very important in particular for Ethernet traffic, where lots of MAC addresses can be used behind the same UE.

There is a need for a more efficient solution to make the 5G LAN group communication feature viable. The present invention has been made with these problems in mind.

In the following, packet(s) refer to the Protocol Data Unit(s) that is/are exchanged with UE(s): IP packets in case of IP PDU Session type, Ethernet Frames in case of Ethernet PDU Session type. According to some examples:

a) the UPF shall be able to locally switch traffic (packet(s)) targeting any MAC address within the MAC addresses used behind a UE (member of the group) by the UPF itself, without the need for SMF instructions to do so. In other words the UPF can autonomously handle the user plane traffic.

b) the UPF forwards packets with an unknown destination address (b1) towards all UPFs involved in the 5G LAN group, i.e. over all Nx tunnels setup by the SMF for the corresponding 5G LAN group. All of the network interlaces (Nx) associated with the group communication may be considered as "tagged" network interfaces, or network interfaces identified as belonging to the group communication. When doing so, the UPF adds (b2) in the Nx tunnel header an information (e.g. a Hop Count parameter) that the packet has already been forwarded over Nx. This (b1: forwarding towards all UPFs involved in the 5G LAN group) requires the N4 protocol to be extended to allow provisioning FARs requesting to distribute replicates of the same packets towards multiple destinations (i.e. multiple Nx tunnels). This (b2: information that the packet has already been forwarded over Nx) requires the protocol used over Nx to allow carrying the information (e.g. a Hop Count parameter) that the packet has already been forwarded over Nx (e.g. already forwarded over an Nx within the group LAN).

c) the UPF that receives a packet from a Nx tunnel checks if it can route the packets towards members of the group supported by that UPF. If the destination address is unknown for the UPF (i.e. it does not correspond to any group member served by the UPF), the UPF drops the packet (due to the packet being marked as having been already forwarded).

d) When receiving packets that have been forwarded over a Nx tunnel, the UPF learns from the source address of those packets the addresses of the UEs served by the forwarding UPF, so as to subsequently route packets targeting those UE addresses without the need for forwarding the traffic towards all Nx tunnels.

FIG. 1 shows parts of a network 100 (e.g. parts of a LAN). In this example there are four UEs: a first UE 101, a second UE 102, a third UE 103, and a fourth UE 104. In other examples there may be more or fewer UEs. A first UPF is shown at 106, and a second UPF is shown at 108. In some examples the UPF can be a physical entity, such as a router. In other examples the UPF may be a piece of software. UEs 101 and 103 are served by UPF 106, and UEs 102 and 104 are served by UPF 108. An SMF is shown at 110. Within UPF 106 a local switch is shown at 112. Within UPF 108 a local switch is shown at 114.

UPF 106 serves an N4 session for UEs 101 and an N4 session for UE 103 (as schematically shown by blocks 116 and 118 respectively). UPF 108 serves an N4 session for UE 102 and an N4 session for UE 104 (as schematically shown by blocks 120 and 122 respectively).

An Nx tunnel 124 is shown between the UPF 106 and the UPF 108. The Nx tunnel enables a group session to be held between the UPFs 106 and 108. That is, in this example, the Nx tunnel 124 enables or facilitates a group session between UEs 101, 102, 103 and 104. Within UPF 106 the hosting of the group session is schematically shown by block 126, and within UPF 108 the hosting of the group session is schematically shown by block 128.

Thus as shown in FIG. 1 an N4 session (i.e. packet forwarding control protocol (PFCP) session) is provisioned by the SMF 110 for every group member (i.e. UEs 101, 102, 103 and 104), with an UL PDR and corresponding FAR to forward traffic intended for local switching or Nx-based forwarding to the local switch (switch 112 for UPF 106 and switch 114 for UPF 108), and with a DL PDR to detect traffic from the local switch with the destination address matching the UE address with a corresponding FAR to forward that traffic towards the UE (i.e. 5G-AN F-TEID of corresponding GTP-U tunnel).

An N4 session (i.e. PFCP session) is provisioned by the SMF 110 in every UPF (in the example of FIG. 1 UPFs 106 and 108, though in other examples there may be more UPFs) involved by 5G LAN group's members with a PDR to detect traffic from the local switch targeting any address of a UE served by another UPF and an associated FAR to forward that traffic to the other UPF, and with another PDR to detect traffic coming from the other UPF and with a FAR to forward it to the local switch.

As discussed above, this requires the SMF 110 to provision every UPF with all the possible target addresses of UE(s) served by other UPFs. For Ethernet traffic, this further requires the SMF 110 to be notified by each UPF whenever a UPF discovers a new MAC address behind the UE.

It is to be noted that a UE acting as a bridge can correspond to tens or hundreds of MAC addresses.

Figure 2:
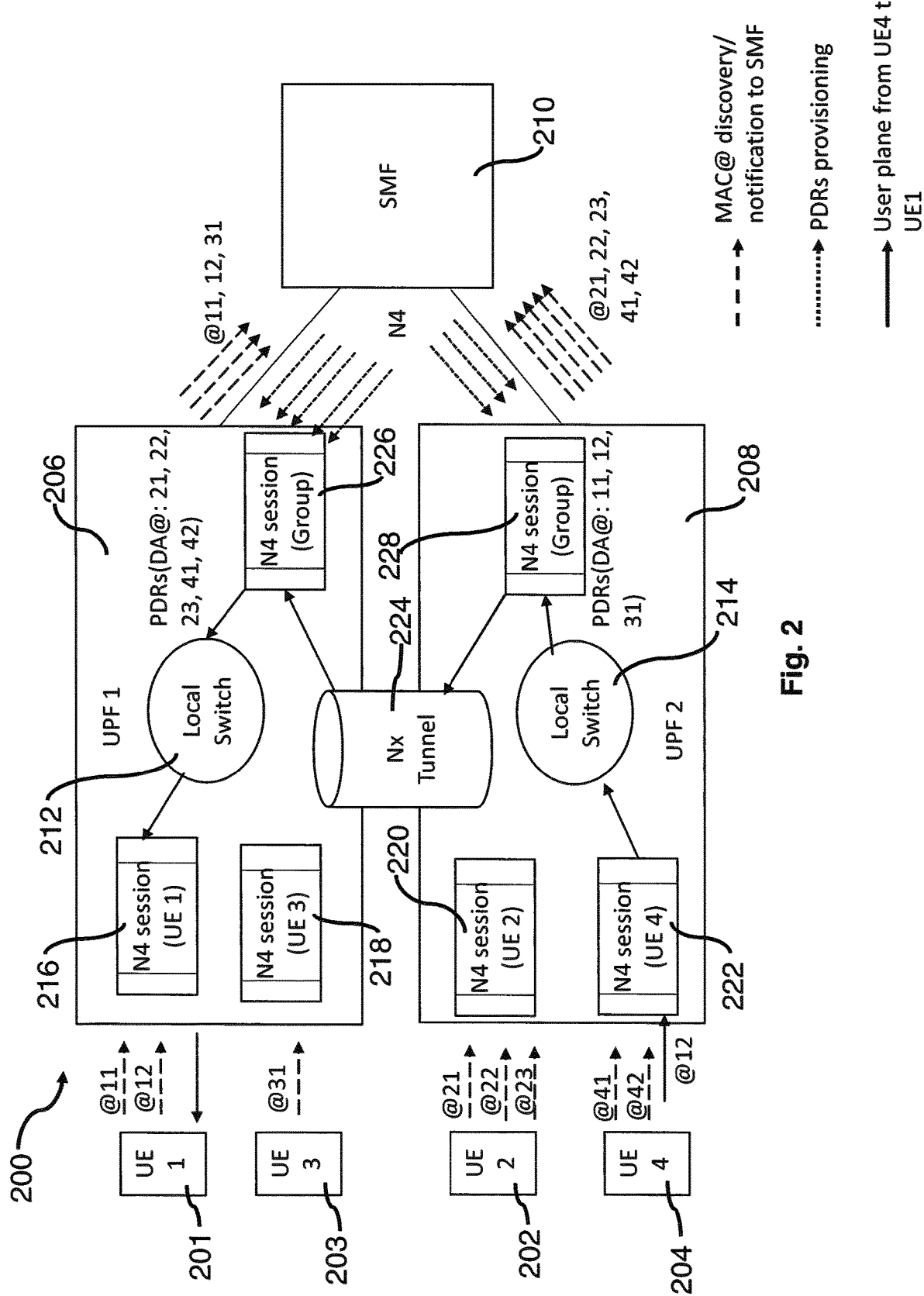
FIG. 2 shows parts of a group LAN according to an example.

Referring to FIG. 2, this shows part of a network 200 (e.g. a 5G LAN group). Aspects in common with FIG. 1 are given a like reference numeral, but in 200 series rather than 100 series (and so on for the subsequent Figures). Assume for instance that MAC addresses @11, @12 are used by UE 201, MAC addresses @41, @42 are used by UE 204 and that a device behind UE 204 sends Ethernet traffic towards MAC @12. The current solution works as follows:

the SMF 210 requires every UPF to notify the SMF 210 whenever the UPF discovers a new MAC behind a UE (for every UE member of the group); and the SMF either:

provisions pro-actively corresponding PDRs in all other UPFs to allow Nx-based forwarding of traffic targeting the new MAC address of the UE towards the corresponding UPF, or UPF2 (e.g. UPF 208) notifies the SMF 210 that it cannot find any matching PDR for the destination address @12, when traffic targeting that address is received. The SMF 210 then provisions reactively the UPF 208 with the PDR to forward the traffic towards the UPF 206. The user plane packet may be lost in this case.

Figure 3:
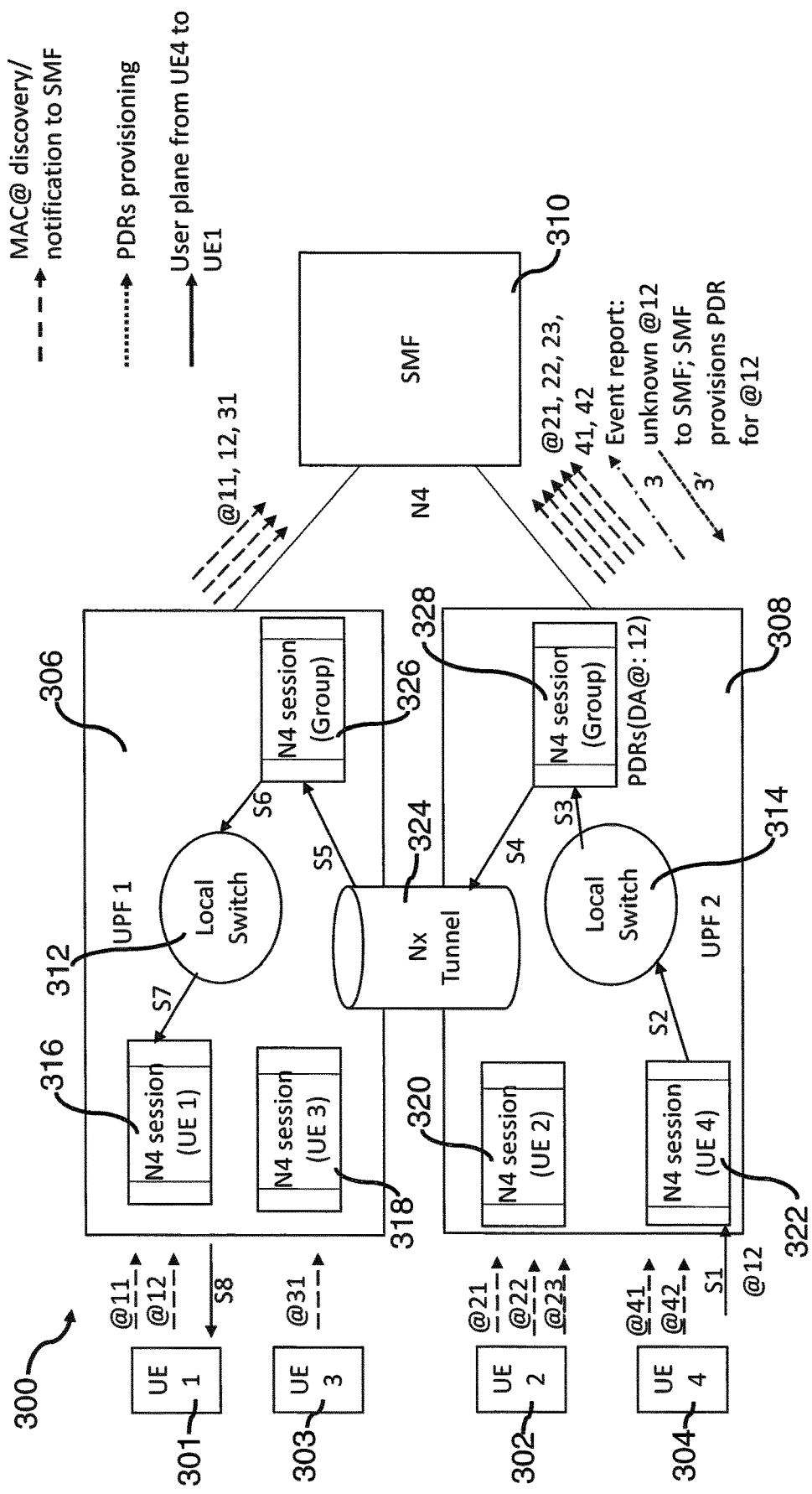
FIG. 3 shows parts of a group LAN according to an example.

This is illustrated in FIGS. 2 and 3. FIG. 3 assumes a case where the user plane packet would not be lost after the step 3—that would though require additional complexity for the UPF to buffer the packet and replay the routing rules after receiving further PDR instructions from the SMF 210. In other words FIG. 2 shows the current PFCP model for 5G LAN group communication, in an example where UE 204 sends traffic to MAC address behind UE1 201, and there is pro-active address provisioning by SMF 210. And in other words FIG. 3 shows the current PFCP model for 5G LAN group communication, in an example where UE4 304 sends traffic to MAC address behind UE1 301, with reactive address provisioning by SMF 310.

Figure 4:
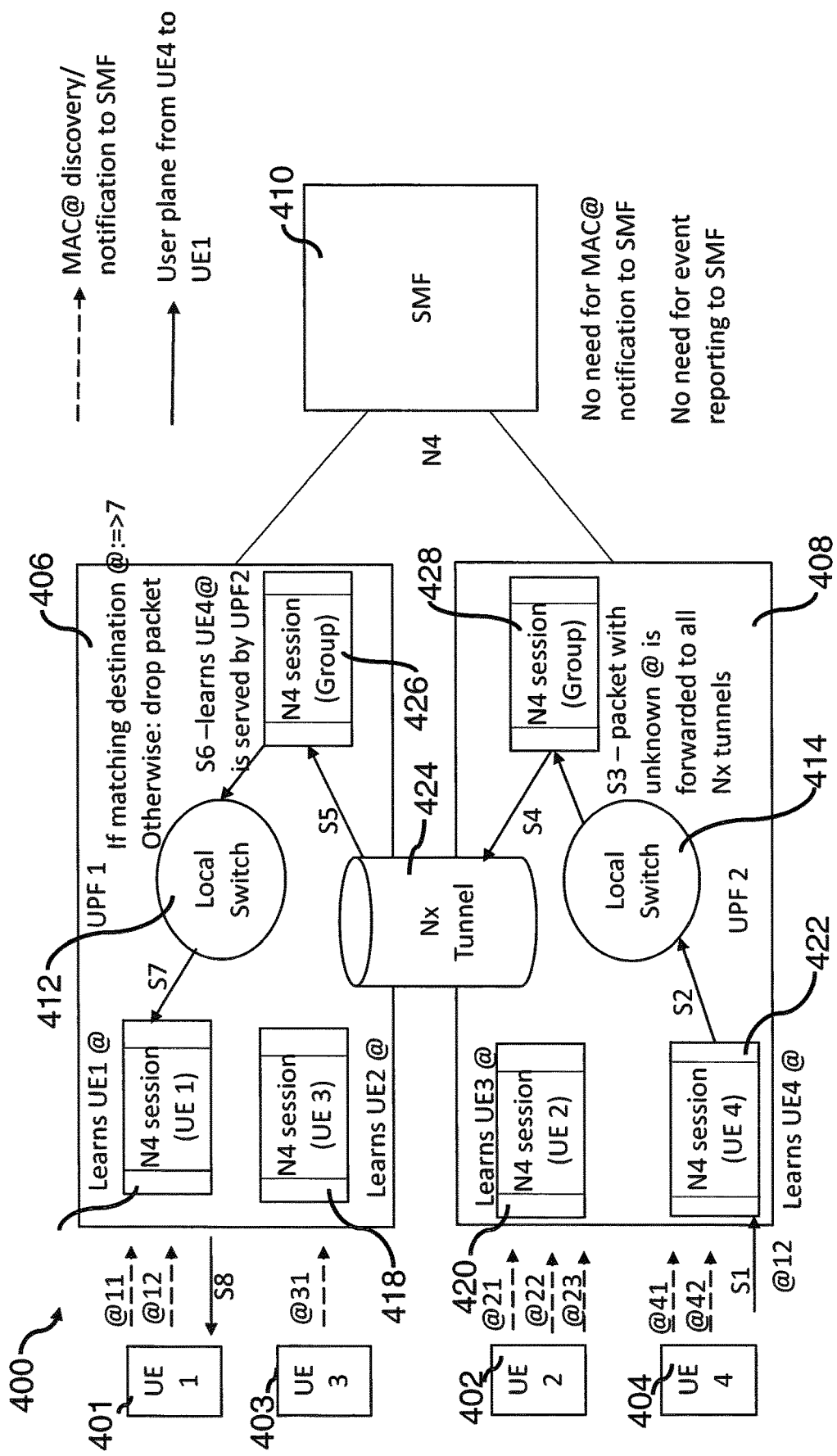
FIG. 4 shows parts of a group LAN according to an example
Figure 5:
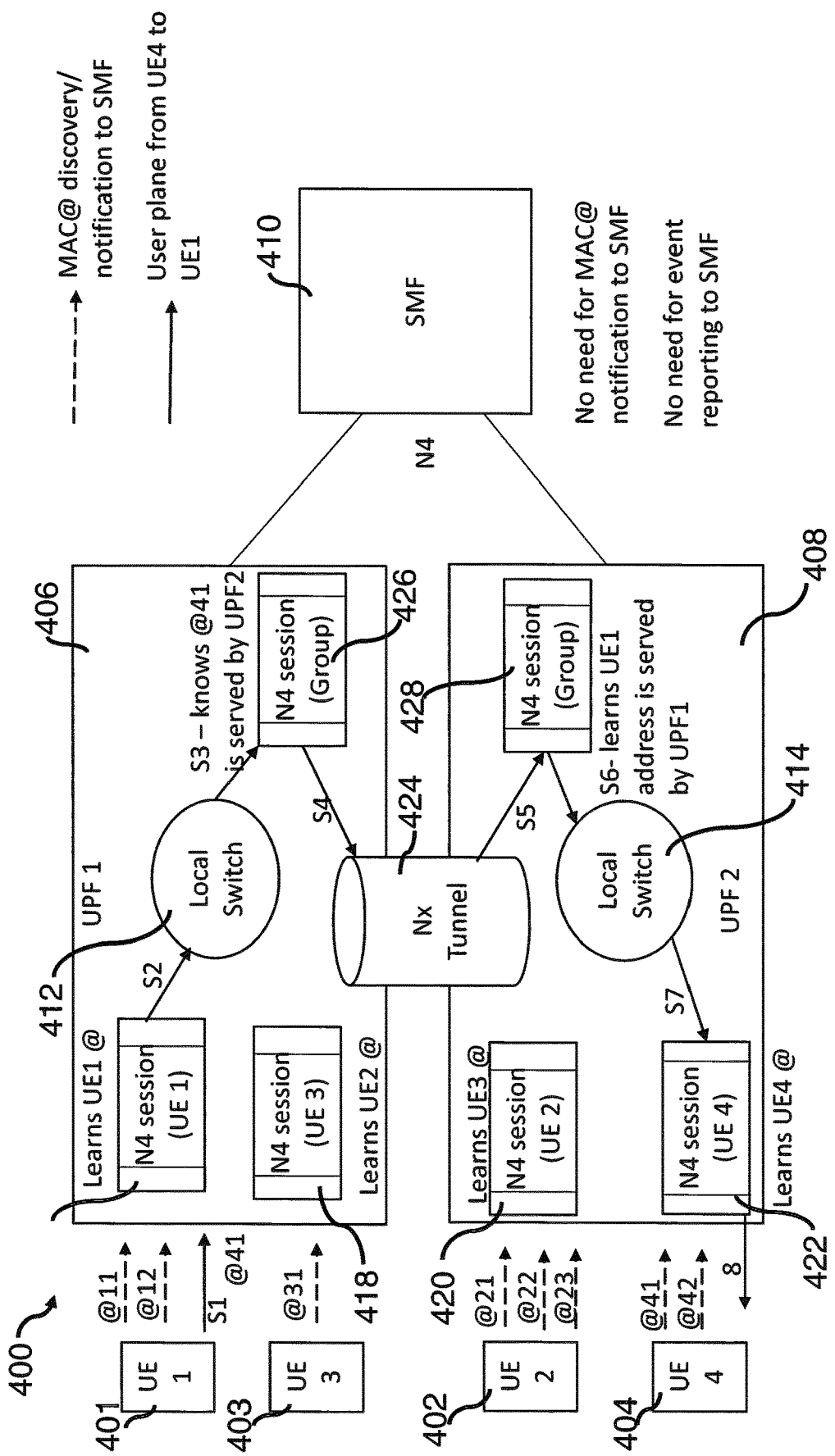
FIG. 5 shows parts of a group LAN according to an example.

The invention is now described in conjunction with FIGS. 4 and 5. FIG. 4 shows an example where UE4 404 sends traffic to MAC address behind UE1 401, and FIG. 5 shows subsequent steps assuming UE1 401 responds to UE4 404. In FIGS. 4 and 5, for ease of explanation two UPFs 406 and 408 are shown within the group communication, supporting respective UEs 401, 403 and 402, 404. It will be understood that in other examples there may be more UPFs and UEs within a group communication. Likewise there may be more than one Nx tunnel connecting the plurality of UPFs in such examples.

The following enhancements to the current models of FIGS. 1, 2 and 3 are proposed by the invention.

a) the UPF (e.g. UPF 406 and 408) is able to locally switch traffic targeting any of the MAC addresses used behind a UE (member of the group) by itself (i.e. at the UPF) without the need for SMF 410 instructions to do so. In other words the UPF can perform autonomous handling of the user plane traffic. This can be done, for example, by setting the 'Ethernet PDU Session Information' in the DL PDR of every UE's N4 session to identify all the (DL) Ethernet packets matching an Ethernet PDU session (see subclause 5.13.1 of TS 29.244). The 'Ethernet PDU Session Information' is currently defined over N4 (TS 29.244) only for N6 traffic. In some examples this is extended to also apply to traffic from Nx-tunnel 424 and for any traffic coming from the local switch (e.g. local switch 412 and/or 414).

b) the UPF forwards packets (b1) that have an unknown destination address towards all UPFs involved in the 5G LAN group, i.e. over all Nx tunnels (e.g. Nx tunnel 424) setup by the SMF 410 for the corresponding 5G LAN group. An "unknown" destination address refers to a destination address that the UPF cannot associate with a N4 Session i.e. a destination address that does not match any PDR in the UPF including PDR built using 'Ethernet PDU Session Information'. When doing so, the UPF adds (b2) in the Nx tunnel header an information (e.g. a Hop Count parameter) indicating that the packet has already been forwarded over Nx. This (b1: forwarding towards all UPFs involved in the 5G LAN group) requires the N4 protocol to be extended to allow provisioning FARs requesting to distribute replicates of the same packets towards multiple destinations (i.e. multiple Nx tunnels). This (b2: information that the packet has already been forwarded over Nx) requires the protocol used over Nx to allow carrying the information (e.g. a Hop Count parameter) that the packet has already been forwarded over Nx Enhancement (b) can be achieved by provisioning to every N4 session (group) with a default PDR (packet detection rule) capturing any traffic from the local switch with an unknown destination address. For example with source interface=5G LAN Internal and network instance set to the identity of the group and wildcard Destination Address and an associated FAR to forward that traffic to other UPFs over the Nx tunnels; if traffic from the local switch matches a PDR of a UE's N4 session, the traffic is sent towards that UE. Otherwise, the UPF matches as a last resort the PDR of the N4 session (group) and the corresponding traffic will be sent to other UPFs, which requires one extension to be defined to the existing PFCP model which does not allow overlapping PDRs for different N4 sessions. cf with subclause 5.2.1 of TS 29.244.

Therefore one UPF behaviour extension needs to be specified to allow provisioning of a N4 session (group) with PDR with source interlace=5G LAN Internal and network instance set to the identity of the group and with a wildcard destination address, such that this PDR (and thus this N4 session) is selected if no other N4 session (group member), with a PDR with source interface=5G LAN Internal and network instance set to the identity of the group and with a Destination Address set to the UE's address (be it configured by the SMF or determined based on 'Ethernet PDU Session Information'), matches the incoming traffic.

The user plane packets can be forwarded over Nx tunnels using the GTP-U protocol (TS 29.281), but with new information element (IE) encoded e.g. in a new GTP-U extension header to indicate that the packet has been forwarded; this can e.g. be encoded under the form of a new Hop Count information set to 1. In other words the method comprises appending information to the user plane traffic indicating that the user plane traffic has been forwarded over a network interface associated with the group communication.

For the forwarding of the user plane packet to multiple other UPFs, the FAR defined in TS 29.244 may e.g. be extended with the possibility to encode multiple Outer Header Creation IEs (instead of encoding only 1 such IE as currently defined). Alternatively, it could also be allowed to associate multiple FARs to one PDR, instead of associating only 1 FAR to a PDR per existing specification.

c) the UPF that receives a packet from a Nx tunnel checks if it can route the packets towards members of the group(s) supported by that UPF. If the destination address is unknown for the UPF (i.e. it does not correspond to any group member served by the UPF), the UPF may be instructed by the SMF to drop the packet (due to the packet being marked as having been already forwarded); the UPF may also be instructed by the SMF to not report any event for unknown destination address for such packet. When N6 applies for the group, one of the UPF supporting the group has a N6 interface and is instructed to forward the packet over N6 (instead of dropping the packet).

Enhancement c) can be achieved by e.g. the N4 session (associated with the 5G LAN group) of the UPF receiving the packets from the Nx tunnel to forward the packets to the local switch, as currently proposed in 3GPP, but with the UPF dropping the packets (marked as having been forwarded) if there is no corresponding N4 session for any group member on the UPF with a PDR matching the destination address of the packet. This may mean adding information that a packet has been marked as having been forwarded as a PDR traffic filter condition. Two default PDR(s) are thus defined according to some examples:

a first default PDR1 capturing any traffic from the local switch with an unknown destination address. For example with source interface=5G LAN Internal and network instance set to the identity of the group and wildcard Destination Address, together with no indication that the packet has been marked as having been forwarded over Nx: the associated FAR replicates this packet over all Nx interfaces related with the group.

a second default PDR2 capturing any traffic from the local switch with an unknown destination address (i.e. with source interface=5G LAN Internal and network instance set to the identity of the group and wildcard Destination Address), together with the indication that the packet has been marked as having been forwarded over Nx: the associated FAR requests to drop the packet (or to send it over N6).

d) when receiving packets that have been forwarded over an Nx tunnel, the UPF shall be able to learn from the source address of those packets the addresses of the UEs served by the forwarding UPF, so as to subsequently route packets targeting these UEs without the need for forwarding the traffic towards all Nx tunnels.

Enhancement d) may be achieved by, for example, setting a new information element (IE) similar to the 'Ethernet PDU Session Information' in a PDR (for traffic coming from the local switch) of the N4 session (group), such that this PDR is considered to match any traffic from the local switch matching the addresses discovered by the UPF from traffic received from other UPFs.

Turning to the example of FIG. 4, in this example MAC addresses @11 and @12 are used by UE1 401; MAC address @31 is used by UE3 403; MAC addresses @21, @22 and @23 are used by UE2 402; and MAC addresses @41 and @42 are used by UE4 404. In the example of FIG. 4 UE4 404 is sending traffic (i.e. one or more packets) to the MAC address @ 12 behind UE1 401.

As shown at S1 and S2, the N4 session 422 established at UPF 408 acts to forward or provide the packet to switch 414. As shown at S3, a determination is carried out by the switch 414 to determine if the destination address (i.e. @12 in this case) is known to switch 414. Packets with a destination address that are unknown to the switch 414 are forwarded through all Nx tunnels in the LAN group. In this example, switch 414 is unaware of the MAC address @12. Accordingly switch 414 forwards the message via N4 session (group) 428 in UPF 408 (S3) towards Nx tunnel 424 for UPF 406 (S4). Nx tunnel 424 then forwards the message to N4 session (group) 426 of UPF 406 (S5). From information in the message the UPF 406 learns or determines the identity of the origin UE, i.e. UE4 404 in this case. The UPF 406 stores this determined identity of the origin UE. The UPF 406 may similarly store identity information of a remote UE, when the user plane traffic is received from a remote UE. UPF 406 also determines from the message that UE4 404 is served by UPF 408 (S6). The UPF 406 stores the determined information of the UPF 408 serving UE4 404. The message is sent towards switch 412 of UPF 406. Due to earlier MAC address discovery, the switch 412 in this case is aware of the destination address and matches MAC address @12 with UE1 401, and forwards the message towards the UE1 401 using the N4 session 416 established at the UPF 406 (S7 and S8). If on the other hand the switch 412 had been unable to match the destination address, then in some examples the packet would have been dropped.

The switch 412 may also performs a determination of whether the message in question has already been forwarded over Nx. To this end the hop-count parameter may be used for this determination. That is the hop-count parameter may be used to determine whether user plane traffic has previously been forwarded over a network interface associated with the group communication.

The hop-count parameter enables a situation to be avoided where a packet received over Nx is further re-sent over Nx, avoiding a potential infinite loop of packet forwarding over Nx. As discussed previously, when receiving packets that have been forwarded over an Nx tunnel, the UPF learns from the source address of those packets the addresses of the UEs served by the forwarding UPF, so as to subsequently route packets targeting those UEs without the need for forwarding the traffic towards all Nx tunnels. This makes replying more efficient.

FIG. 5 shows an example where UE1 replies or is otherwise sending traffic to UE4. In the example of FIG. 5 the UE1 401 is sending traffic (i.e. one or more packets) to the MAC address @41, which is behind UE4 404.

At S1, a packet is sent from UE1 401 to UPF 406 (i.e. the UPF serving UE1 401). The active N4 session 416 causes the packet to be forwarded to switch 412. From the information obtained at S6 in FIG. 4, the switch 412 knows that the MAC address @41 is served by UPF 408 (S3). Accordingly, switch 412 causes the packet to be sent to UPF 408 via Nx tunnel 424 (S4 and S5). At the UPF 408, the packet is forwarded between the Nx tunnel and the local switch (S5 and S6), by means of the active N4 session 428. As also shown at S6, the switch 414 learns that the UE1 401 address is served by UPF 406 (e.g. for future use). The packet is then forwarded to UE4 404 by means of N4 session 422 (S7 and S8).

Subsequent traffic between the same UE1 401 and UE4 404 addresses is always routed directly to the UPF that is known to support the destination address.

As a possible alternative, the UPF could send an address discovery message (e.g. a GTP-U Echo Request with a new Destination Address field) to all Nx tunnels associated with the group (network instance), rather than sending the received user plane packet, when receiving a user plane packet from the local switch with an unknown destination address. UPFs receiving that message would return an answer indicating whether they can route packets targeting the Destination Address. The UPF can then forward the user plane packet to the target UPF supporting the Destination Address.

It can be understood from a comparison of FIGS. 2 and 3 with FIGS. 4 and 5, that in the examples of the invention in FIGS. 4 and 5 there is no need for MAC address notification to the SMF. Furthermore, there is no need for event reporting to SMF.

The proposal allows the UPF to perform local switching or Nx-based forwarding of traffic of a 5G LAN group with minimal support from the SMF. The SMF merely needs to setup the Nx tunnels between all UPFs involved by the members of the group (i.e. by all UPFs serving PDU sessions of UEs of the group). Then traffic is locally switched or forwarded to other UPFs on its own, based on automatic learning of IP or MAC addresses, or by distributing the traffic to all other UPFs when a destination address is not yet known.

In examples the UPF does not need to notify the SMF of every address of every UE (which may be important, in particular for Ethernet traffic where numerous MAC addresses may be used behind every UE).

Furthermore, the SMF does not need to provision every UPF with every possible destination address of all UEs of the group for Nx based forwarding.

This may remove the need for possibly extensive provisioning in UPF and signalling over N4, for large groups.

It will be understood that in the examples of FIGS. 4 and 5 the UPFs 406 and 408 have, in some respects, displayed different functionalities. It will be understood nonetheless that in examples a single UPF may combine all of the functionalities described with respect to UPFs 406 and 408.

Figure 6:
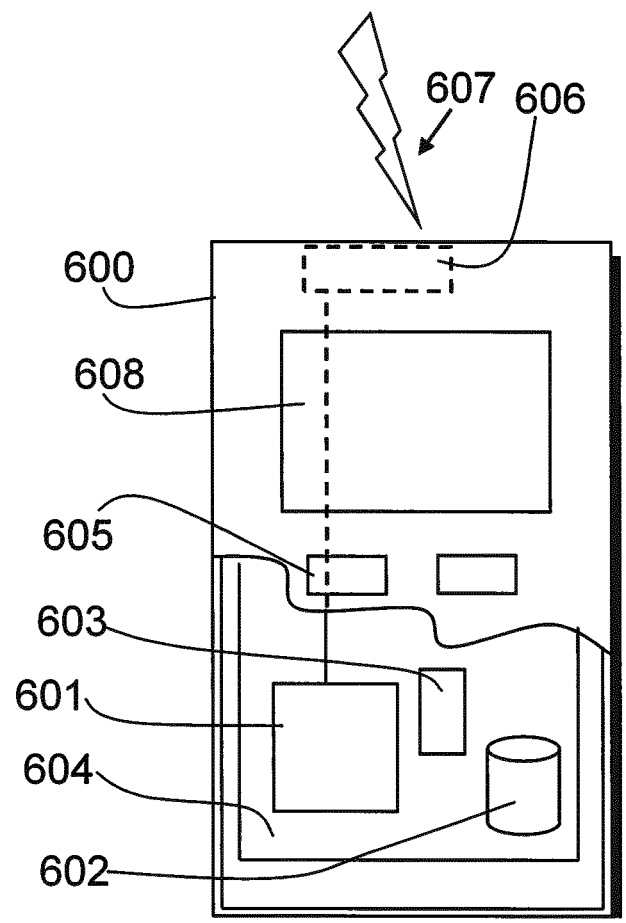
FIG. 6 schematically shows an example of a communication device.

A possible wireless communication device will now be described in more detail with reference to FIG. 6 showing a schematic, partially sectioned view of a communication device 600. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 600 may receive signals over an air or radio interface 607 via appropriate apparatus for receiving and may transmit signals via appropriate apparatus for transmitting radio signals. In FIG. 6 transceiver apparatus is designated schematically by block 606. The transceiver apparatus 606 may be provided for example by means of a radio part and associated antenna arrangement. The antenna arrangement may be arranged internally or externally to the wireless device.

A wireless device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the wireless device by means of a suitable user interface such as key pad 605, voice commands, touch sensitive screen or pad, combinations thereof or the like. A display 608, a speaker and a microphone can be also provided. Furthermore, a wireless communication device may comprise appropriate connectors (either wired or wireless) to other devices and/or for connecting external accessories, for example hands-free equipment, thereto. The communication devices 602, 604, 605 may access the communication system based on various access techniques.

Figure 7:
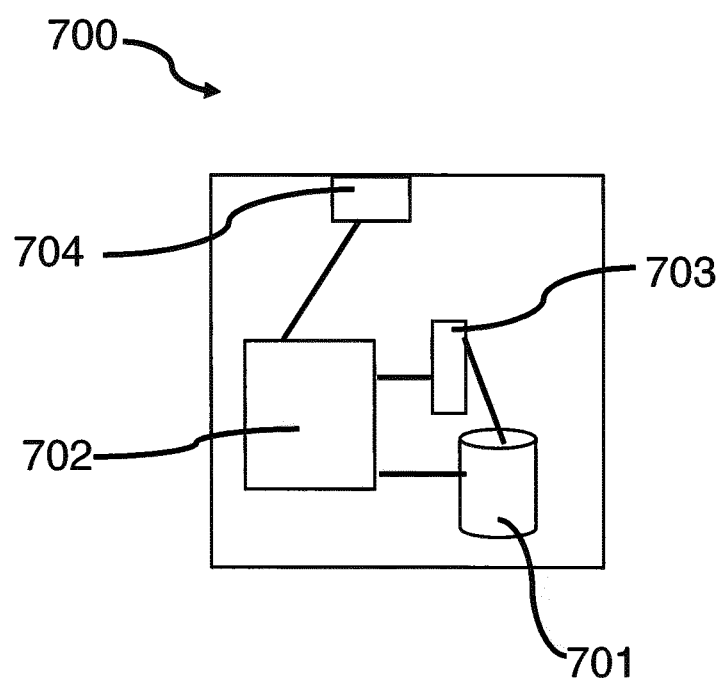
FIG. 7 schematically shows an example of a control apparatus.

FIG. 7 shows an example of a control apparatus for a communication system, for example to be coupled to and/or for controlling a station of an access system, such as a RAN node, a UPF, a base station (gNB), a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller.

The control apparatus 700 can be arranged to provide control on communications in the service area of the system. The control apparatus 700 comprises at least one memory 701, at least one data processing unit 702, 703 and an input/output interface 704. Via the interface the control apparatus can be coupled to a receiver and a transmitter. The receiver and/or the transmitter may be implemented as a radio front end or a remote radio head. For example the control apparatus 700 or processor 701 can be configured to execute an appropriate software code to provide the control functions.

Figure 8:
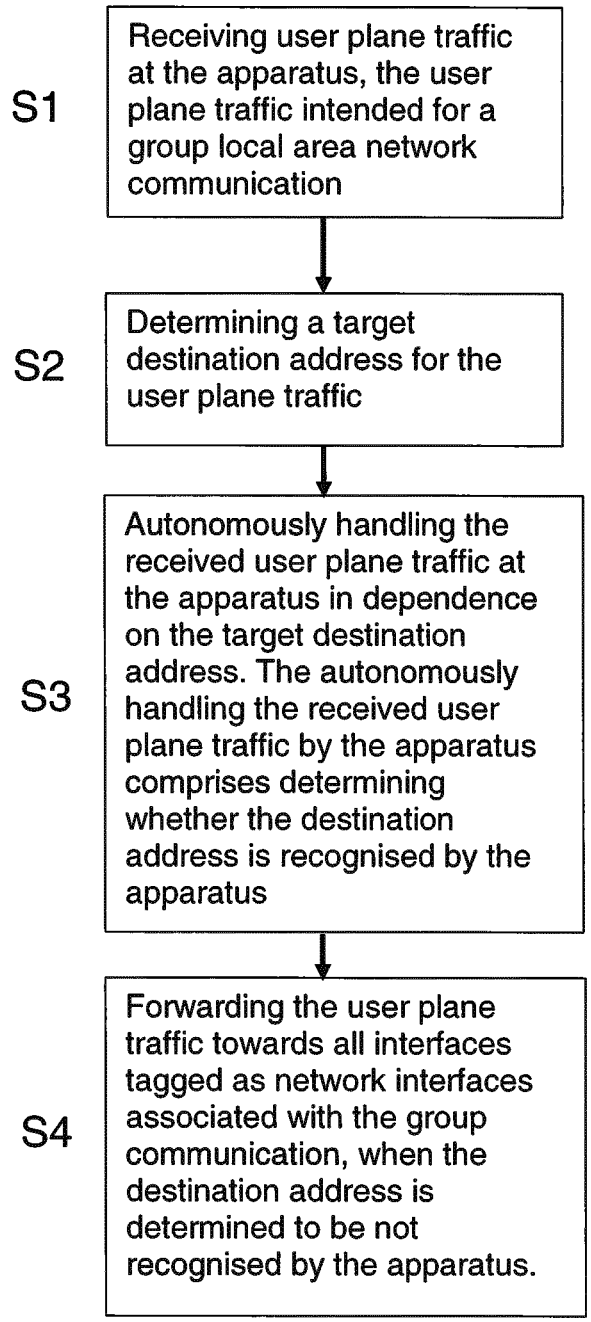
FIG. 8 is a flow-chart of a method according to an example.

FIG. 8 is a flow-chart of a method viewed from the perspective of an apparatus. In some examples the apparatus may be a UPF.

At S1, the method comprises receiving user plane traffic at the apparatus, the user plane traffic intended for a group local area network communication.

At S2, the method comprises determining a target destination address for the user plane traffic.

At S3, the method comprises autonomously handling the received user plane traffic at the apparatus in dependence on the target destination address. The autonomously handling the received user plane traffic by the apparatus comprises determining whether the destination address is recognised by the apparatus.

At S4 the method comprises forwarding the user plane traffic towards all interfaces tagged as network interfaces associated with the group communication, when the destination address is determined to be not recognised by the apparatus.

Figure 9:
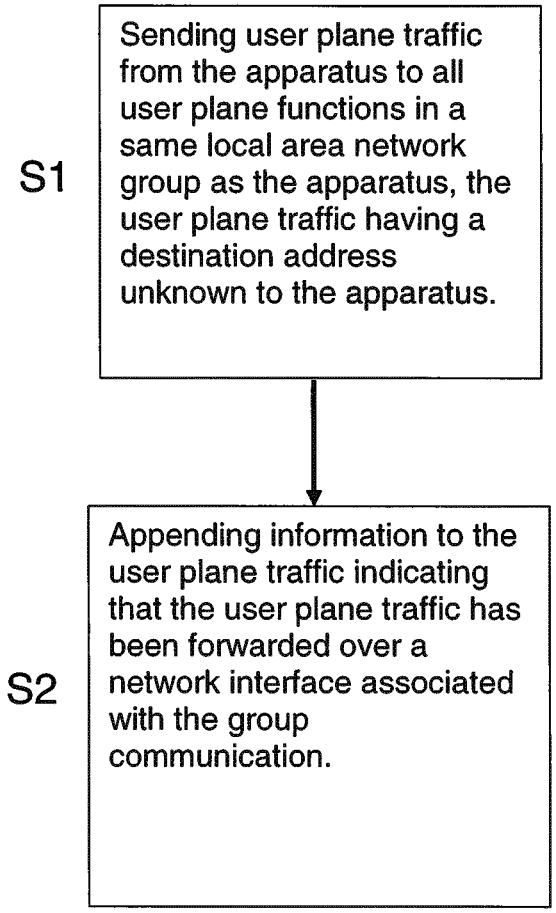
FIG. 9 is a flow-chart of a method according to an example.

FIG. 9 is a flow-chart of a method viewed from the perspective of an apparatus. In some examples the apparatus may be a UPF.

At S1, the method comprises sending user plane traffic from the apparatus to all user plane functions in a same local area network group as the apparatus, the user plane traffic having a destination address unknown to the apparatus.

At S2, the method comprises appending information to the user plane traffic indicating that the user plane traffic has been forwarded over a network interface associated with the group communication.

Thus, it will be understood that according to examples, in addition to N6-based forwarding of user plane traffic for 5G-LAN group communication, the SMF and UPF may support local switch and Nx-based forwarding:

Local switch, where traffic is locally forwarded by a single UPF if this UPF is the common PSA UPF of different PDU Sessions for the same 5G LAN group;

Nx-based, where the UL/DL traffic for the 5G-LAN communication is forwarded between PSA UPFs of different PDU sessions via Nx. Nx is based on a shared User Plane tunnel connecting PSA UPFs of a single 5G LAN group.

The SMF may configure the UPF(s) to apply different traffic forwarding methods to route traffic between PDU Sessions for a single 5G LAN group. For example, depending on the destination address, some packet flows may be forwarded locally, while other packet flows are forwarded via Nx and other packet flows are forwarded to N6.

The local switch and Nx-based forwarding methods require that a common SMF is controlling the PSA UPFs for the 5G-LAN group.

To enable local switch in a UPF, the following applies:

The SMF may provide FARs for 5G LAN group members' N4 Sessions (i.e. N4 Session corresponding to PDU Session) with Destination Interface set to "5G LAN internal" and Network Instance set to represent the 5G LAN group in order to instruct the UPF to again perform classification of packets using the corresponding 5G LAN group relevant PDRs.

The SMF also may provide PDRs for 5G LAN group members' N4 Session (i.e. N4 session corresponding to PDU Session) with Source Interface set to "5G LAN internal" and Network Instance set to represent the 5G LAN group in order to instruct the UPF to detect packets that have been sent to classification via the local switch. This is done by configuring the PDRs in the target 5G LAN group members' N4 Session to include the destination IP/MAC address(es) of these UEs or to include an Ethernet PDU Session Information that refers to all MAC addresses used as source address within UL traffic of that PDU Session.

To enable Nx-based forwarding in a UPF, the following applies:

The SMF provides FARs for 5G LAN group members' N4 Sessions (i.e. N4 Session corresponding to PDU Session) with Destination Interface set to "5G LAN Nx" and Network Instance set to represent the 5G LAN group in order to instruct the UPF to again perform classification of packets using the corresponding 5G LAN group relevant PDRs.

SMF creates a group-level N4 session to each UPF involved by a 5G LAN group for forwarding packets to a Nx tunnel. The SMF optionally configures the group-level N4 session for processing packets received from a Nx tunnel. Such a N4 session is created per UPF and 5G LAN group (i.e. a group-level N4 session not corresponding to a PDU Session).

The SMF provides relevant N4 rules (e.g. PDRs, QERs, URSs and FARs) for the group-level N4 session applicable for the Nx tunnel(s) in the UPF. The SMF may provide PDRs for the group-level N4 session with Source Interface set to "5G LAN Nx" and Network Instance set to represent the 5G LAN group in order to instruct the UPF to detect packets that are targeting the Nx-based forwarding. In case of multiple Nx tunnels between different PSA UPFs, the SMF may provide N4 rules corresponding to the different Nx tunnels in a single group-level N4 Session.

To match the traffic of the UE(s) whose traffic should be forwarded across the Nx tunnel, the PDRs of the group-level N4 Session includes the destination IP/MAC address(es) of these UEs.

The SMF may proactively update N4 rules for group level N4-Session to enable correct routing of packets towards UE whose PSA UPF has been reallocated.

The SMF may also configure a default PDR in the group-level N4 Session to capture the packets pertaining to 5G LAN group communication with an unknown destination address and either a URR to trigger reporting of such events. This enables the SMF to reactively configure relevant PDR and FAR to forward the packets to another UPF via Nx, based on the reports from UPF or a PDR capturing any traffic from the local switch with an unknown destination address (i.e. a PDR with source interface set to 5G LAN Internal and network instance set to the identity of the 5G LAN group and wildcard Destination Address) together with no indication that the packet has been forwarded over Nx; this PDR is associated with a FAR requiring to replicate this packet over all Nx interfaces related with the group (a FAR associated with multiple instances of the Outer Header Creation attribute).

When forwarding traffic over Nx, the UPF adds in the Nx tunnel header an indication that the packet has already been forwarded over Nx. This is controlled by a FAR attribute.

a PDR capturing any traffic from the local switch with an unknown destination address (i.e. a PDR with source interface set to 5G LAN Internal and network instance set to the identity of the 5G LAN group and wildcard Destination Address) together with the indication that the packet has been forwarded over Nx; this PDR may be associated with a FAR requiring to drop the traffic or with a FAR requiring to forward the traffic to N6.

The following table describes the Packet Detection Rule (PDR) containing information required to classify a packet arriving at the UPF. Every PDR is used to detect packets in a certain transmission direction, e.g. UL direction or DL direction.

| Attribute | Description | Comment |
| --- | --- | --- |
| N4 Session ID | Identifies the N4 session associated to this PDR | |

| Attribute | | Description | Comment |
|---|---|---|---|
| Rule ID | | Unique identifier to identify this rule | |
| Precedence | | Determines the order, in which the detection information of all rules is applied | |
| Packet detection information | Source interface | Contains the values "access side", "core side", "SMF", "N6-LAN", "5G LAN internal", "5G LAN Nx" | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), from "5G LAN internal"(i.e. local switch), or from "5G LAN Nx" (i.e. Nx interface). |
| | UE IP address | One IPv4 address and/or one IPv6 prefix with prefix length (NOTE 3) | |
| | Network instance (NOTE 1) | Identifies the Network instance associated with the incoming packet | |
| | CN tunnel info | CN tunnel info on N3, N9 interfaces, i.e. F-TEID | |
| | Packet Filter Set | Details see clause 5.7.6, TS 23.501. | |
| | Application ID | | |
| | QoS Flow ID | Contains the value of 5QI or non-standardized QFI | |
| | Ethernet PDU Session Information | Refers to all the (DL) Ethernet packets matching an Ethernet PDU session, as further described in clause 5.6.10.2 and in TS 29.244 [65]. NOTE X. | |
| | indication that the packet has been forwarded over Nx | May contain the value "already forwarded over Nx". Applies only to Source interface = "5G LAN Nx". Usage is defined in clause 5.8.2.13. | |
| | Framed Route Information | Refers to Framed Routes defined in clause 5.6.14 | Details like all the combination possibilities on N3, N9 interfaces are left for stage 3 decision. |
| Outer header removal | | Instructs the UP function to remove one or more outer header(s) (e.g. IP + UDP + GTP, IP + possibly UDP, VLAN tag), from the incoming packet. | Any extension header shall be stored for this packet. |
| Forwarding Action Rule ID (NOTE 2) | | The Forwarding Action Rule ID identifies a forwarding action that has to be applied. | |
| Multi-Access Rule ID (NOTE 2) | | The Multi-Access Rule ID identifies an action to be applied for handling forwarding for a MA PDU Session. | |
| List of Usage Reporting Rule ID(s) | | Every Usage Reporting Rule ID identifies a measurement action that has to be applied. | |
| List of QoS Enforcement Rule ID(s) | | Every QoS Enforcement Rule ID identifies a QoS enforcement action that has to be applied. | |

NOTE 1:

Needed e.g. in case:

UPF supports multiple DNN with overlapping IP addresses;

UPF is connected to other UPF or AN node in different IP domains.

UPF "local switch"and Nx forwarding is used for different 5G LAN groups.

NOTE 2:

Either a FAR ID or a MAR ID is included, not both.

NOTE 3:

The SMF may provide an indication asking the UPF to allocate one IPv4 address and/or IPv6 prefix. When asking to provide an IPv6 Prefix the SMF provides also an IPv6 prefix length.

NOTE X:

Ethernet PDU Session Information may apply in case the source interface is within "N6-LAN", "5G LAN Nx" or "5G LAN internal". It refers to Ethernet addresses within traffic having been received for the same Network instance and for the same N4 session.

The following table describes the Forwarding Action Rule (FAR) that defines how a packet shall be buffered, dropped or forwarded, including packet encapsulation/decapsulation and forwarding destination.

| Attribute | Description | Comment |
|---|---|---|
| N4 Session ID | Identifies the N4 session associated to this FAR. | |
| Rule ID | Unique identifier to identify this information. | |
| Action | Identifies the action to apply to the packet | Indicates whether the packet is to be forwarded, duplicated, dropped or buffered. When action indicates forwarding or duplicating, a number of additional attributes are included in the FAR. For buffering action, a Buffer Action Rule is also included. |
| Network instance (NOTE 2) | Identifies the Network instance associated with the outgoing packet (NOTE 1). | |
| Destination interface (NOTE 3) (NOTE 7) | Contains the values "access side", "core side", "SMF", "N6-LAN", "5G LAN internal" or "5G LAN Nx". | Identifies the interface for outgoing packets towards the access side (i.e. down-link), the core side (i.e. up-link), the SMF, the N6-LAN (i.e. the DN or the local DN), to 5G LAN internal (i.e. local switch), or to 5G LAN Nx (i.e. Nx interface). |

| Attribute | Description | Comment |
| --- | --- | --- |
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI). Any extension header stored for this packet shall be added. Multiple occurrence of the "Outer header creation" attribute may be defined (NOTE X) |
| "indication that the packet has been forwarded over Nx" creation | May contain the value "already forwarded over Nx". Applies only to Destination interface = "5G LAN Nx". | Multiple occurrence of the "indication that the packet has been forwarded over Nx" creation" attribute may be defined (NOTE X) |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | |
| Forwarding policy (NOTE 3) | Reference to a preconfigured traffic steering policy or http redirection (NOTE 4). | Contains one of the following policies identified by a TSP ID:- an N6-LAN steering policy to steer the subscriber's traffic to the appropriate N6 service functions deployed by the operator, or a local N6 steering policy to enable traffic steering in the local access to the DN according to the routing information provided by an AF as described in clause 5.6.7. or a Redirect Destination and values for the forwarding behaviour (always, after measurement report (for termination action "redirect")). |
| Request for Proxying in UPF | Indicates that the UPF shall perform ARP proxying and/or IPv6 Neighbour Solicitation Proxying as specified in clause 6.6.10.2. | Applies to the Ethernet PDU Session type. |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructionsto be applied by the UPF (NOTE 6) | |

NOTE 1:
Needed e.g. in case:
UPF supports multiple DNN with overlapping IP addresses;
UPF is connected to other UPF or NG-RAN node in different IP domains;
UPF "local switch"and Nx forwarding is used for different 5G LAN groups.
NOTE 2:
These attributes are required for FAR action set to forwarding.
NOTE 3:
These attributes are required for FAR action set to forwarding or duplicating.
NOTE 4:
The TSP ID is preconfigured in the SMF, and included in the FAR according to the description in clauses 5.6.7 and 6.1.3.14 of 23.503 [45] for local N6 steering and 6.1.3.14 of 23.503
NOTE 5:
This attribute is present for FAR action set to buffering.
NOTE 6:
The buffering action rule is created by the SMF and associated with the FAR in order to apply a specific buffering behaviour for DL packets requested to be buffered, as described in clause 5.8.3 and clause 5.2.4 in TS 29.244 [65].
NOTE 7:
The use of "5G LAN Internal"instructs the UPF to send the packet back for another round of ingress processing using the active PDRs pertaining to another N4 session of the same 5G LAN. To avoid that the packet matches again the same PDR, it is assumed that the packet has been modified in some way (e.g. tunnel header has been removed, the packets being received from the source interface 5G LAN Internal of the same 5G LAN).
NOTE X:
This may be used e.g. to support 5G-LAN group communication (see clause 5.8.2.13)

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
at least one processor; and
at least one memory including computer program code, the at least one memory and computer program code configured to, with the at least one processor, cause the apparatus to perform:
receiving user plane traffic at the apparatus, the user plane traffic intended for a group local area network communication;
determining a target destination address for the user plane traffic; and
autonomously handling the received user plane traffic at the apparatus in dependence on the target destination address; and
wherein the autonomously handling the received user plane traffic by the apparatus comprises determining whether the destination address is recognised by the apparatus;
determining whether the user plane traffic has already been forwarded by setting a hop-count parameter that avoids the user plane traffic being forwarded that has already been forwarded; and
forwarding the user plane traffic towards all interfaces tagged as network interfaces associated with the group communication, when the destination address is determined to be not recognised by the apparatus, wherein when forwarding the user plane traffic, a tunnel header is included that identifies whether or not the user plane traffic has already been forwarded.

2. An apparatus according to claim 1, wherein the at least one memory and computer program code are further configured to, with the at least one processor, cause the apparatus to perform forwarding the user plane traffic to the target destination address when the apparatus recognises the target destination address.

3. An apparatus according to claim 1, wherein the at least one memory and computer program code are further configured to, with the at least one processor, cause the apparatus to perform determining whether the user plane traffic comprises information indicating that the user plane traffic has previously been forwarded over a network interface associated with the group communication, and dropping the user plane traffic when it is determined that the apparatus does not recognise the target destination address and the user plane traffic has been previously forwarded over a network interface associated with the group communication.

4. An apparatus according to claim 1, wherein the at least one memory and computer program code are further configured to, with the at least one processor, cause the apparatus to perform storing information of user equipment addresses of user equipment served by a user plane function from which the apparatus received the user plane traffic, when receiving user plane traffic from a remote user equipment or from a network interface associated with the group communication.

5. An apparatus according to claim 1, wherein the at least one memory and computer program code are further configured to, with the at least one processor, cause the apparatus to perform using stored information of remote user equipment addresses when sending user plane traffic by the apparatus to one or more of the user equipment or to a network interface associated with the group communication.

6. An apparatus according to claim 1, wherein the apparatus comprises a user plane function.

7. An apparatus according to claim 1, wherein the user plane traffic comprises one of: an internet protocol packet of a packet data unit session; or an Ethernet frame of an Ethernet packet data unit session.

8. A method comprising:
receiving user plane traffic at an apparatus, the user plane traffic intended for a group local area network communication;

determining a target destination address for the user plane traffic; and autonomously handling the received user plane traffic at the apparatus in dependence on the target destination address; and wherein the autonomously handling the received user plane traffic by the apparatus comprises determining whether the destination address is recognised by the apparatus;

determining whether the user plane traffic has already been forwarded by setting a hop-count parameter that avoids the user plane traffic being forwarded that has already been forwarded; and forwarding the user plane traffic towards all interfaces tagged as network interfaces associated with the group communication, when the destination address is determined to be not recognised by the apparatus, wherein when forwarding the user plane traffic, a tunnel header is included that identifies whether or not the user plane traffic has already been forwarded.

9. A method according to claim 8, wherein the method further comprises determining whether the user plane traffic comprises information indicating that the user plane traffic has previously been forwarded over a network interface associated with the group communication, and dropping the user plane traffic when it is determined that the apparatus does not recognise the target destination address and the user plane traffic has been previously forwarded over a network interface associated with the group communication.

10. A method according to claim 8, wherein the method further comprises storing information of user equipment addresses of user equipment served by a user plane function from which the apparatus received the user plane traffic, when receiving user plane traffic from a remote user equipment or from a network interface associated with the group communication.

11. A method according to claim 8, wherein the method further comprises using stored information of remote user equipment addresses when sending user plane traffic by the apparatus to one or more of the user equipment or to a network interface associated with the group communication.

12. A method according to claim 8, wherein the apparatus comprises a user plane function.

13. A method according to claim 8, wherein the user plane traffic comprises one of: an internet protocol packet of a packet data unit session; or an Ethernet frame of an Ethernet packet data unit session.

* * * * *